United States Patent [19]
Kipp

[11] Patent Number: 5,933,474
[45] Date of Patent: *Aug. 3, 1999

[54] TELECOMMUNICATIONS CALL PRESERVATION IN THE PRESENCE OF CONTROL FAILURE AND HIGH PROCESSING LOAD

[75] Inventor: Lyle Dean Kipp, Woodridge, Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,117

[22] Filed: Dec. 24, 1996

[51] Int. Cl.⁶ .............................. H04M 1/24; H04M 3/08; H04M 3/22
[52] U.S. Cl. .................................. 379/1; 379/9; 379/14; 395/181; 395/182.08; 395/182.11; 370/217
[58] Field of Search .................................. 379/1, 2, 9–18, 379/32, 34, 112, 207, 210, 211, 212, 217, 220, 221, 222, 229, 230; 370/216, 217, 218, 219, 220; 395/616, 618, 181, 182.02, 182.04, 182.08, 182.09, 182.11, 182.13

[56] References Cited

U.S. PATENT DOCUMENTS

| | | | |
|---|---|---|---|
| 4,912,698 | 3/1990 | Bitzinger et al. | 379/279 |
| 4,949,373 | 8/1990 | Baker, Jr. et al. | 379/96 |
| 5,235,700 | 8/1993 | Alaiwan et al. | 395/575 |
| 5,452,441 | 9/1995 | Esposito et al. | 395/182.11 |
| 5,452,443 | 9/1995 | Oyamada et al. | 395/182.08 |
| 5,544,077 | 8/1996 | Hershey | 364/570 |
| 5,548,710 | 8/1996 | Oono et al. | 395/181 |
| 5,592,466 | 1/1997 | Buczny et al. | 370/217 |
| 5,636,341 | 6/1997 | Matsushita et al. | 395/182.11 |
| 5,661,719 | 8/1997 | Townsend et al. | 370/216 |
| 5,664,090 | 9/1997 | Seki et al. | 395/182.13 |

*Primary Examiner*—Curtis A. Kuntz
*Assistant Examiner*—Binh K. Tieu
*Attorney, Agent, or Firm*—Werner Ulrich

[57] ABSTRACT

This invention relates to methods and apparatus for continuing the processing of a telecommunications call in the presence of a failure of a call processor. A backup processor is designated for each call, and a file of signaling messages for that call is maintained in that backup processor. When a failure of the call processor is detected, the file of accumulated messages for the call is processed by the backup processor in order to build up a call state for the call, but without sending call control messages for the call. Subsequent signaling messages are processed by the backup processor, including transmitting call control messages to other processors for establishing the call. In accordance with this invention, the storing of a file of backup messages is eliminated when the processors have inadequate spare processing capacity because of high traffic. Advantageously, this permits the backup procedure to be carried out under normal circumstances without reducing the processing capacity of the system. Advantageously, the backup processor only processes signaling messages when a failure is detected thus greatly reducing the processing resources required for a typical call (which, of course, does not involve a processor failure).

2 Claims, 5 Drawing Sheets

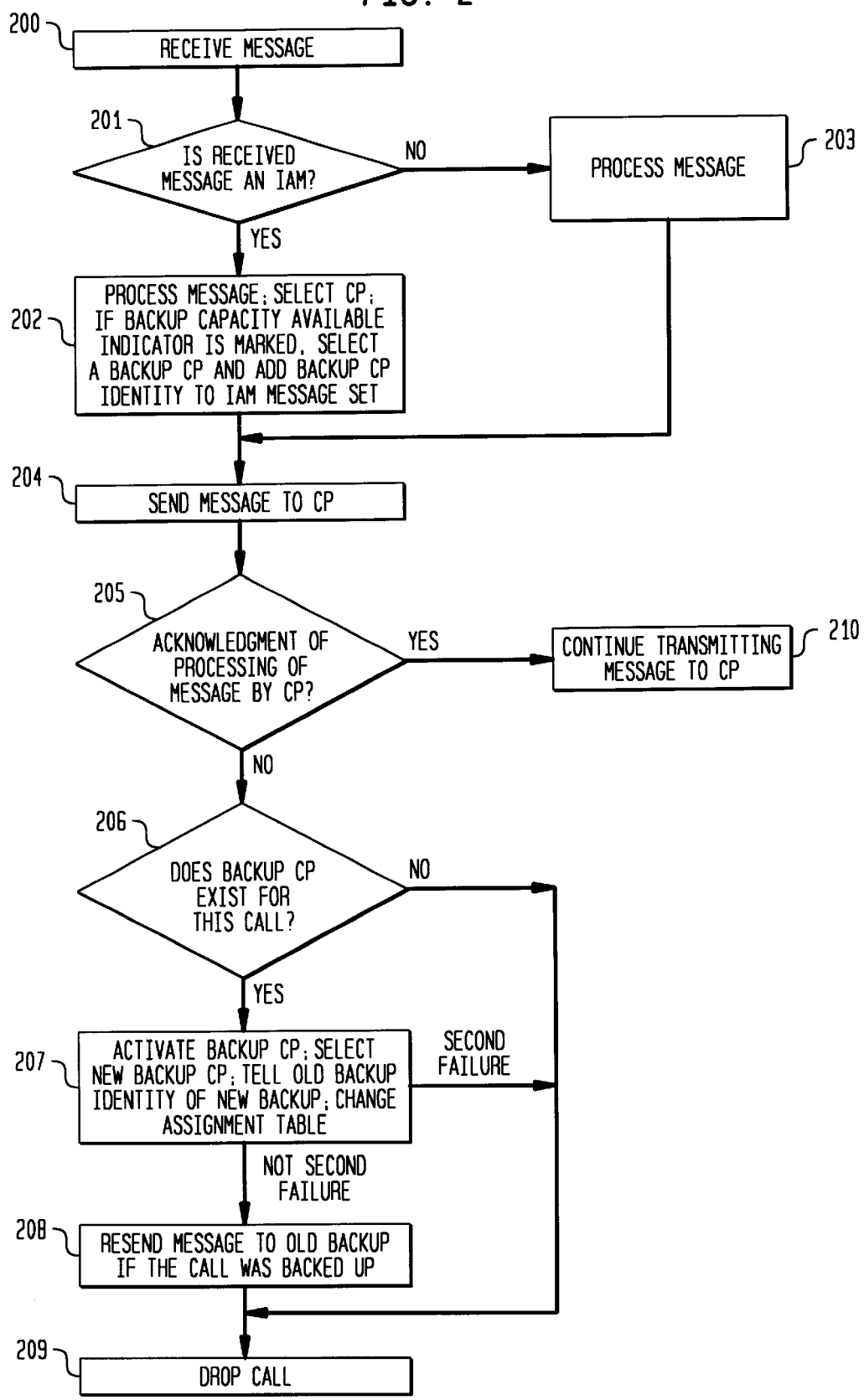

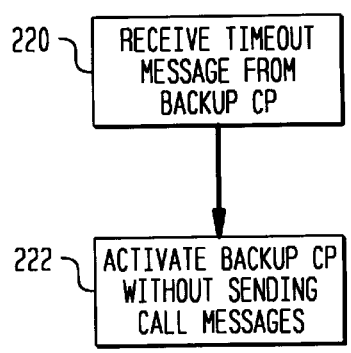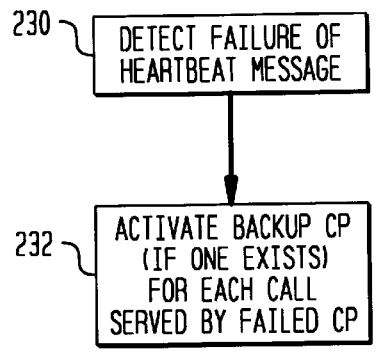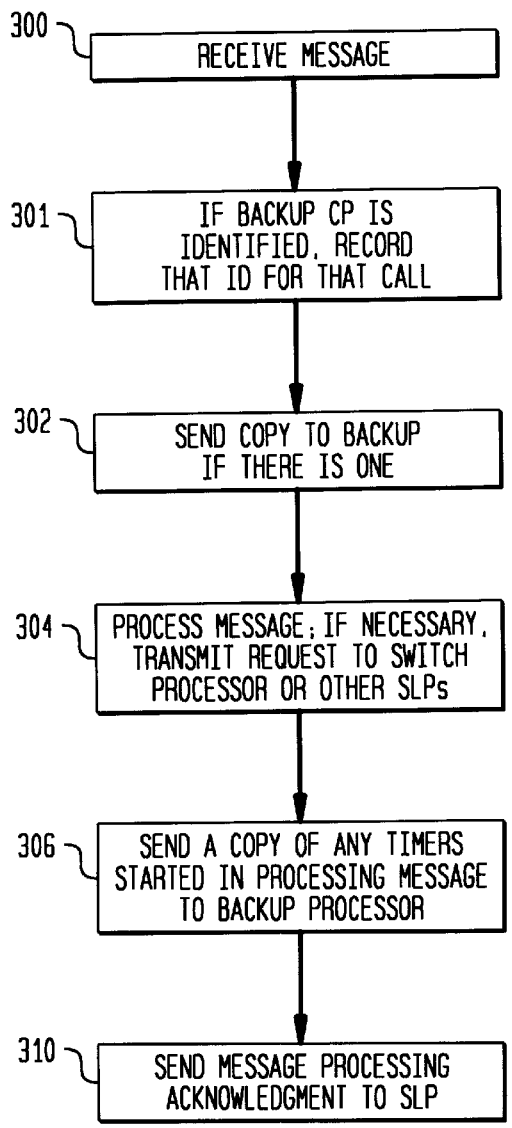

TELECOMMUNICATIONS CALL PRESERVATION IN THE PRESENCE OF CONTROL FAILURE AND HIGH PROCESSING LOAD

RELATED APPLICATION

This application is related to T. W. Anderson et al.: "Control of Telecommunications Networks" Ser. No. 08/609,161, and to A. E. Frey: "Telecommunications Call Preservation in the Presence of Control Failure" Ser. No. 08/609,160, both of which are assigned to the assignee of this application.

TECHNICAL FIELD

This invention relates to call processing in telecommunication networks.

PROBLEM

In stored program controlled telecommunications networks and switching systems, control of all calls is concentrated in a relatively small number of program controlled processors. If any of these processors fail or are otherwise out of service, a large number of telephone calls are adversely affected. At the same time, telephone administrations and telephone operating companies are demanding networks and switching systems that are capable of offering service with fewer and fewer imperfectly handled calls.

Not all failures are equipment failures. The software for controlling modern telecommunications networks is very complex and frequently changed. If new software is introduced, there is a significant probability that at least some types of telephone calls will not be properly served by this new software, even if these same calls had been properly served by a previous version of the control software. Also, processors may be unavailable because they are taken out of service for routine maintenance.

In the cited applications, a new control configuration is being proposed which protects against equipment failures of control processors. That arrangement protects against the loss of a large number of telephone calls arriving after a control processor failure, and saves calls which are in progress but have not yet been established. The call failure rate demands of present telephone administrations and operating companies are such that the number of calls which could be expected to be lost from equipment failures of processors would exceed the allowable number of lost calls if switching systems could not recover calls in the process of being established. The solution offered by the related applications reduces the call handling capacity of the processors. A problem of the prior art, therefore, is that there is no efficient, satisfactory arrangement for meeting the rigorous demands for very low call failure rates demanded by present day telephone administrations and operating companies without decreasing the capacity of the call processors.

SOLUTION

The above problem is solved, and an advance is made over the teachings of the prior art, in accordance with the principles of this invention wherein signaling messages for a call are stored in another processor as well as the serving processor; subsequently, when the serving processor fails, (the failure can be in software or hardware), a backup processor processes the stored signaling messages, in order to build up a call state, and then continues processing the call until the call is established; the backup processor stores the signaling messages only when it has adequate call processing capacity at the beginning of the call.

In accordance with one preferred embodiment, signaling messages are transmitted to a call processor for serving the call, and this call processor then transmits a copy of the signaling message to a backup processor if the backup processor has adequate processing capacity at the beginning of the call. When the backup processor is called into service because of a failure in software or hardware by the original serving call processor, the backup processor processes all previous messages in order to establish a call state for the call and then proceeds from that call state to continue serving that call until the call is established. Advantageously, only call message data is transmitted to the backup call processor thereby avoiding a large amount of additional transmission of call state information for the large percentage of calls which are successfully completed without resorting to a backup processor. Advantageously, if the backup processor contains an earlier software version, that processor will then be able to serve a call which a processor controlled by the latest software version does not serve properly. Advantageously, the capacity of the backup processor is not adversely affected because it only receives messages when it has adequate spare capacity at the beginning of the call.

BRIEF DESCRIPTION OF THE DRAWING

FIG. 2–8 are flow diagrams of actions performed by various processors to implement applicant's invention.

DETAILED DESCRIPTION

Figure 1:
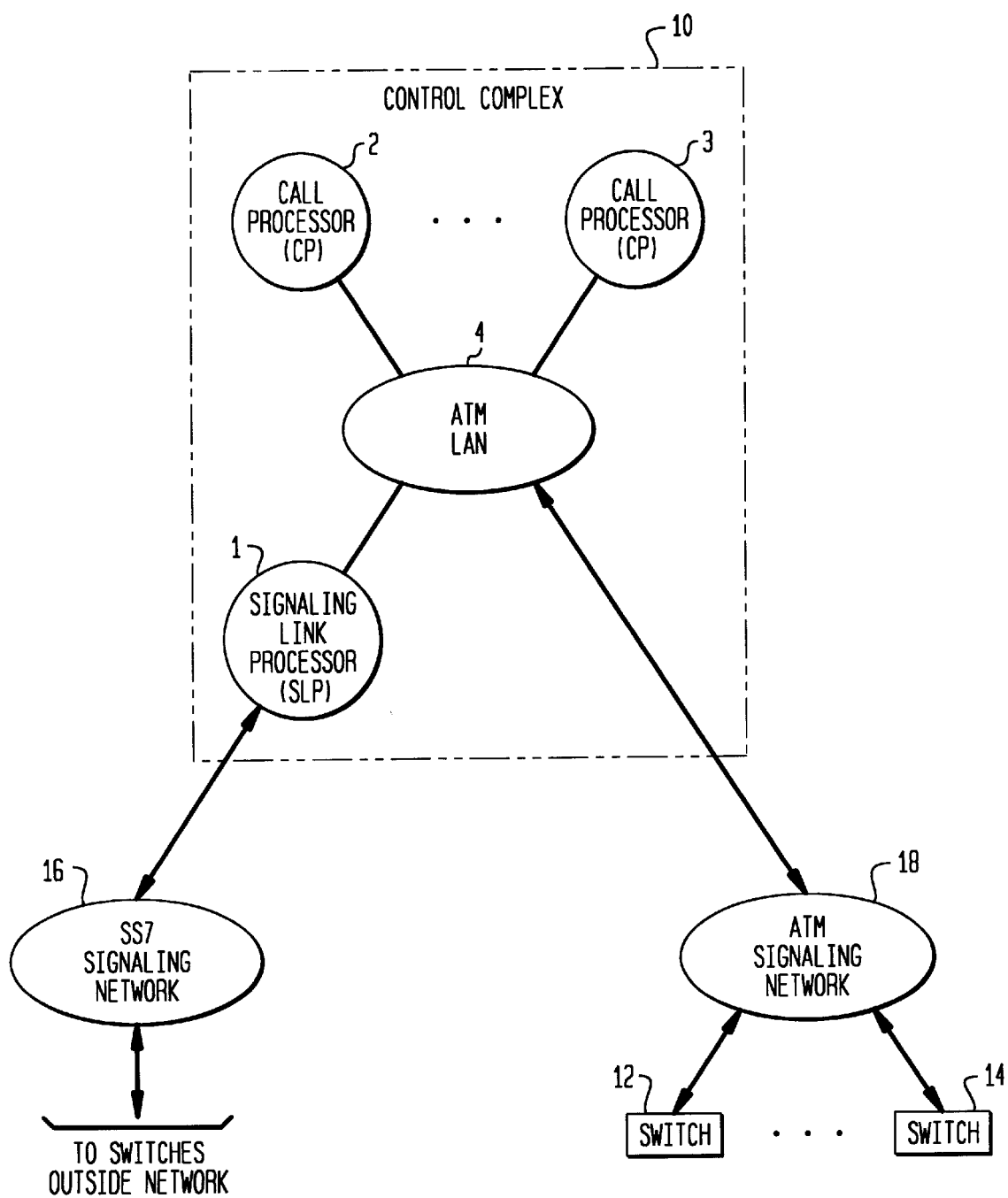
FIG. 1 is a block diagram illustrating a network for use with applicant's invention.

FIG. 1 is a block diagram of the control arrangement used in applicant's preferred embodiment. The control complex 10, a switching processing platform, is described in more detail in the related application being filed concurrently herewith. Control for the telecommunications network resides in a plurality of control complexes 10, one of which is shown in the block diagram. The control complex includes a signaling link processor 1, two (and generally more) call processors 2 and 3, an ATM local area network (ATM/LAN) 4 for interconnecting the processors 1, 2, and 3, and for connecting them to an ATM signaling network 18 for transmitting signals to and receiving signals from other control complexes and switches 12, . . . , 14 of the telecommunications network. Other processors (not shown) of the control complex 10 are also connected to ATM/LAN 4, but are not pertinent to the principles of this invention. ATM signaling network 18 transmits signals among the switches and to the control complex and SS7 network 16 transmits signals to and receives signals from switches outside the network.

Figure 7:
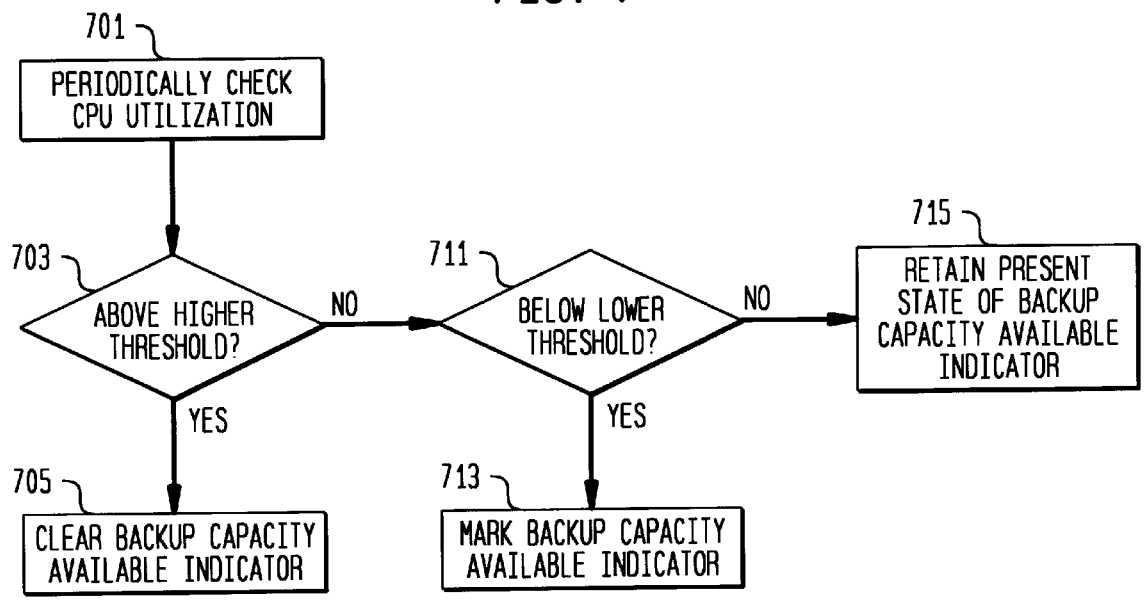

FIGS. 2–4 and 7 are flow diagrams illustrating the pertinent segments of the operation of the signaling link processor (SLP) 1. The SLP periodically checks to see whether there is sufficient capacity to back-up all calls (FIG. 7). In action block 701, the SLP checks for the level of call processor central processing unit (CPU) utilization in the system. The call processor (CP) central processing unit (CPU) utilization has been found to represent the most useful indication of ability to process additional load. If the utilization is above a higher threshold (test 703), then a back-up capacity available indicator is cleared and subsequent calls will not be backed up using a back-up CP. If the result of test 703 is negative, then test 711 is used to determine whether the CP CPU utilization is below a lower threshold. If so, then the back-up capacity available indicator is marked (action block 713). If the result of test 711 is negative, indicating that the CP CPU utilization is between thresholds, then the present state of the back-up capacity available indicator is retained. It is desirable to have two different thresholds so that the state does not oscillate. In other implementations, multiple thresholds can be used; different fractions of calls will be backed up under such an arrangement.

In FIG. 2, the SLP receives a message (action block 200), and processes the message, Processing the message includes a test of whether the message is an initial address message (test 201). If the message is an initial address message (IAM), the message is processed and the call processor is selected at the time of the reception of the IAM (action block 202). The SLP maintains a table relating trunks to call processors so that messages, which are identified by the trunk to which the messages pertains, can be routed to the correct call processor. This call processor has been selected and its identity is obtained from a table relating a trunk of the call to a message. In addition, when the SLP receives an IAM, it checks to see if the back-up capacity available indicator is set; if so, the SLP also selects a back-up CP, and arranges to notify the CP of the identity of the back-up CP along with the IAM message or message set (action block 202). In general, the selection of the CP is performed to balance the load among call processors, or to select a processor for a particular type of call, e.g., an 800 call, not served by all processors. The back-up CP is selected so that calls are uniformly distributed among the other CPs; if a particular type of CP is required for a particular type of call, the same type of CP is required as a back-up CP. In addition, the signaling link processor keeps track of which processors have been determined to be defective and steers all calls away from these processors. In this particular example, a call is being served by call processor 2 and call processor 3 is acting as a backup for serving the call in case of a failure in processor 2. If this is not an IAM, the message is processed (action block 203). Following the processing of the message, the message is sent to the serving processor (action block 204).

Subsequently, test 205 determines whether an acknowledgement of the message transmitted to the call processor is received within a specified time. If so, then the SLP can continue to transmit messages for that call to the serving call processor (action block 210). If no acknowledgement is received, then, test 206 determines whether there is a backup processor for this call. If not, the call is dropped (action block 209). If so, then the backup processor is activated for that call (action block 207). A backup processor is activated for all calls served by a particular processor in case a signaling link processor fails to receive a heart beat message from that processor, indicating a gross failure. However, a failure of acknowledgement may represent a software failure for a particular type of call, therefore all calls need not be switched to a backup processor. A signaling link processor also checks at the time of action block 207 to see whether a backup had previously been activated for that call and for that particular message; in the latter case, the call is dropped (action block 209) since other attempts to process that message are likely to be futile. In addition (action block 207), the SLP selects a new backup CP, and tells the old backup CP the identity of the new backup CP and changes the assignment table. In an alternative embodiment, a new backup CP is assigned only if the backup capacity available indicator is marked. If a new backup CP is activated, the message most recently received for the call is sent from the SLP to the new backup (action block 208) and call processing proceeds.

FIG. 3 illustrates actions performed by the SLP in case a timeout message is sent from the backup processor (action block 220). In that case, the backup processor is activated for that call (action block 222), and the original serving processor is deactivated; in this case no call message is sent from the SLP to the backup processor, because it is assumed that the call processor had already sent the most recent call message.

FIG. 4 illustrates actions performed by the SLP in case of a failure to receive heartbeat messages from a call processor. Heartbeat messages are sent periodically, usually following some test or audit procedure, to assure the SLP that the call processor is still operational. If a failure to receive heartbeat messages is detected as a result of a timeout in the SLP (action block 230), the SLP will activate backup call processors for all calls currently served by the call processor whose heartbeat message is missing and backed up by a backup processor (action block 232). The same action (action block 232) is performed if a threshold of allowable error rate is exceeded by a call processor. The most recent message is sent for all calls served by the failing call processor to the appropriate backup processors. In this embodiment, such calls are not backed up by a new backup processor, although in an alternative embodiment they can be backed up. It is probably safer to avoid backing up such calls in case one of the calls is causing the gross failure as a result of a software bug.

FIG. 5 is a flow diagram of actions performed in the call processor. A message is received (action block 300). If a backup CP is identified, the identity of that backup CP is recorded in the CP for that call (action block 301). The SLP selects and informs the call processor of the identity of the backup processor at the time of the initial address message. A copy of the message is transmitted to the backup processor if such a processor has been identified for that call (action block 302). The call processor then processes the message (action block 304). The processing of the message may, for example, require sending a request to a switch processor to establish a connection. The processing may also require sending an SS7 message for another trunk, such as an outgoing trunk, which message may be transmitted by a different signaling link processor. If the act of processing a message requires the activation of timers (for example, in case further information is requested from the caller), then a copy of any timer started in processing the message is also transmitted to the backup processor if one has been identified for that call (action block 306). After the processing of the message is completed, an acknowledgment is sent to the signaling link processor (action block 310). Note that for the case of a request for additional information, or, in general, for some action requiring further timing, another message is expected, and so the processing has been completed for this message.

Figure 6:
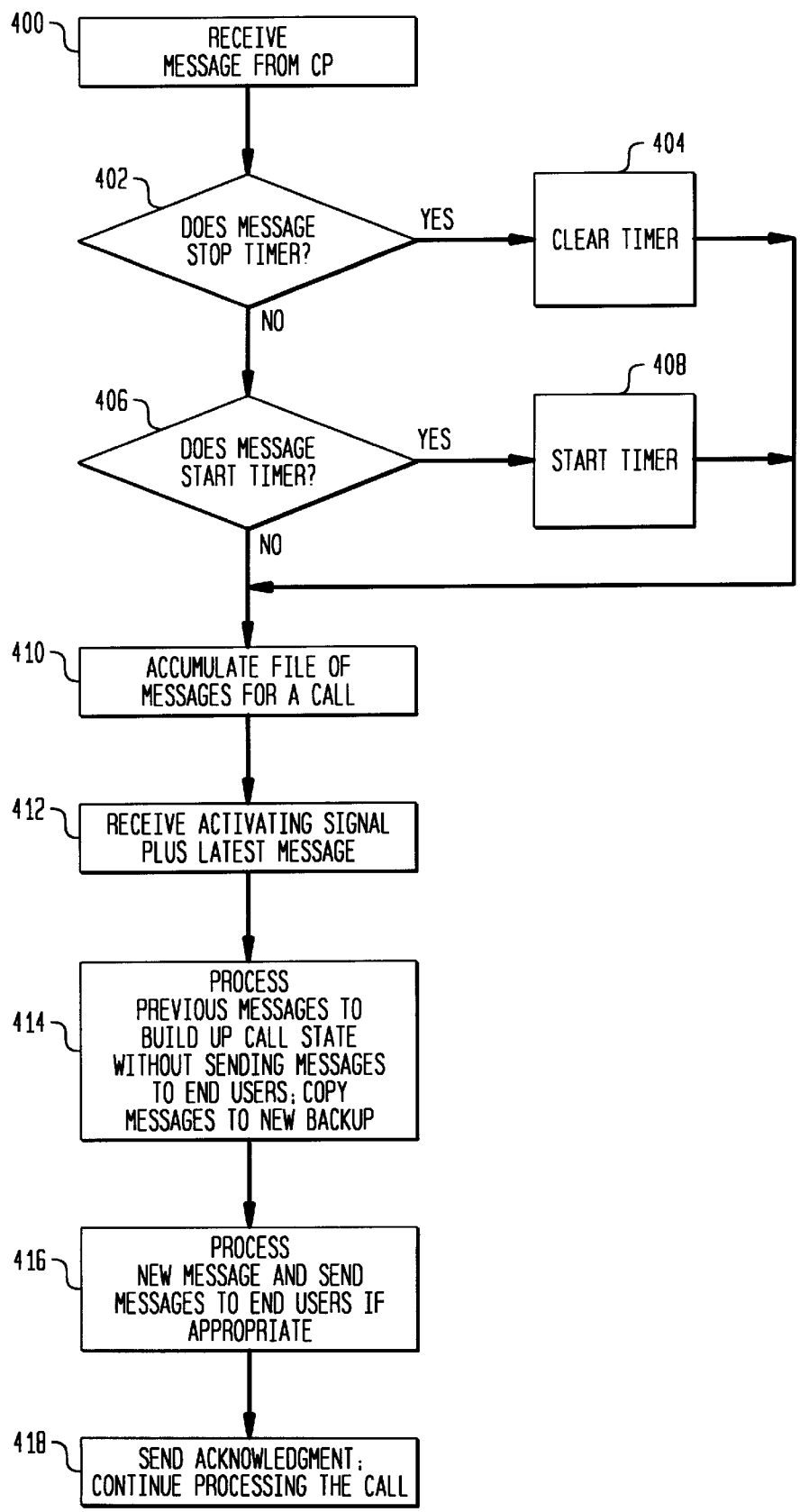
Figure 8:
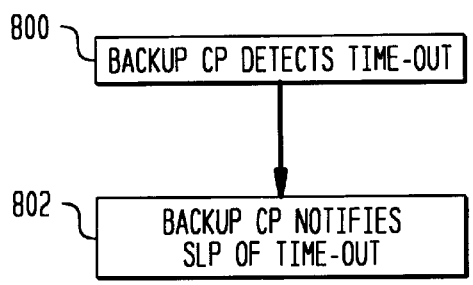

FIGS. 6 and 8 flow diagrams of actions performed in the backup CP. A backup CP received a message from the call processor (action block 400). The backup CP tests whether the message stops a timer (test 402). If so, that timer is cleared (action block 404). If not, the backup CP tests whether the message starts a timer (test 406). If so, the timer is started (action block 408). If not, or following completion of either block 404 or block 408, the backup CP accumulates a file of messages and timer states for a call (action block 410). If the signaling link processor determines that the call processor has failed on this call, the SLP will transmit an activation signal plus the latest message to the backup CP received therein in action block 412. The backup CP will then process all previous messages to build up a call state (action block 414). The backup CP then processes the new message and sends messages to end users if appropriate (action block 416). The backup CP will then send an acknowledgement to the signaling link processor and continue processing the call (action block 418).

The backup CP performs timing as described with respect to FIG. 6. If a timeout is detected in a timing process (action block 800), the backup CP sends a message to the SLP (action block 802) which leads to the actions initiated in block 220, FIG. 3.

In an alternative arrangement, the SLP retains a copy of all messages for calls which have not yet been disconnected. The file of such messages is then sent from the SLP when the backup CP is activated for a call; this removes the necessity for sending messages to a backup CP for the high percentage of calls which are completed successfully. A disadvantage is that customer dialed inputs, especially those that are detected after initial dialing is complete, may not come through the signaling link processor, but would be stored if the backup CP approach were used.

In an alternative embodiment, the source of the backup CP activation message is a processor of the switch serving a trunk of the call. This switch processor maintains, in parallel with the signaling link processor, the identity of the designated backup processor for the call of each trunk. If the backup CP detects a timeout, it transmits a report to the switch processor. Heartbeat messages are sent to a switch processor, and failure of heartbeat is detected by that processor. Message processing acknowledgement messages are sent to the SLP; the SLP reports failure to receive such acknowledgement messages to the switching processor. The switching processor, in response to one of these indicators of failure of a CP, sends an activation message to the backup CP.

In another alternative embodiment, the switch processor is used for storing the messages of a call. This processor is also informed of customer dialed inputs. The disadvantage is that signaling massages are not otherwise required to be transmitted to the switch processor.

I claim:

1. In a telecommunications network, apparatus for providing reliable service for the control of the establishment of calls, comprising:

means for receiving interoffice signaling messages related to a call, and for transmitting the received messages to a call processor;

means for receiving and storing received interoffice signaling messages related to said call;

a plurality of at least three call processors responsive to receipt of interoffice signaling messages for controlling establishment of calls, one of said call processors for controlling establishment of said call, and another of said call processor designated as a backup processor for said call;

wherein said one call processor serves a plurality of calls and a plurality of processors serve as backup processors for different calls served by said one call processor, and wherein each of said backup processors normally serves another plurality of calls;

means for detecting failure of the one call processor and for activating said backup processor for said call;

means for transmitting only the stored interoffice signaling messages and not the call in processor information to said backup processor;

said backup processor, responsive to being activated, for processing the interoffice signaling messages stored prior to a detection of a failure of said one call processor in order to build up a call state for said call;

said backup processor processing interoffice signaling messages received after the detection of said failure in order to continue the control of the establishment of said call;

wherein said backup processor processes interoffice signaling messages received prior to detection of said failure only if a failure is detected;

characterized in that said means for storing signaling messages related to said call, tests whether adequate spare real time capacity is available in said, backup processor and wherein said backup processor does not store said signaling messages when inadequate spare real time processing capacity is available at the time that processing of said call begins thereby losing backup capability for said call; and wherein said standby processor continues to store received interoffice signaling messages for a call once it has been determined that adequate spare real time processing capacity is available at the time that the processing of said call began.

2. In a telecommunications network comprising a plurality of at least three call processors a method of providing reliable service for the control of establishment of calls, comprising the steps of:

receiving interoffice signaling messages related to a call, and transmitting the received messages to one of said call processors;

storing the received interoffice signaling messages related to said call;

the one call processor, responsive to receipt of the interoffice signaling messages related to said call, controlling establishment of said call;

designating another of said call processors as a backup processor for said call;

detecting failure of said one call processor;

responsive to said detecting failure, activating said backup processor for said call;

transmitting the stored interoffice signaling messages to said backup processor;

in said backup processor, responsive to being activated for said call, processing the interoffice signaling messages stored prior to a detection of a failure of said call processor in order to build up a call state for said call;

in said backup processor, processing interoffice signaling messages received after the detection of said failure in order to continue the control of the establishment of said call;

wherein said one call processor serves a plurality of calls and a plurality of different call processors serve as backup processors for calls served by said one processor;

wherein said backup processor processes interoffice signaling messages received prior to detection of said failure only if a failure is detected;

characterized in that the step of storing the received signaling messages related to said call comprises the steps of testing whether adequate spare real time processing capacity is available in said call processor; and bypassing said storing when inadequate spare real time processing capacity is available in said backup processor at the time that processing of said call begins, thereby losing backup capability for said call; and continuing to store said received interoffice signaling messages for a call once it has been determined that adequate spare real time processing capacity was available at the time that processing of said call began.

* * * * *